United States Patent [19]
Chatelain

[11] 3,935,672
[45] Feb. 3, 1976

[54] DEVICE FOR THE RETENTION OF WATER IN FLOWER CONTAINERS

[76] Inventor: Louis-Robert Chatelain, Case Postale 217, 1211 Geneva 26, Switzerland

[22] Filed: Aug. 5, 1974

[21] Appl. No.: 494,860

[52] U.S. Cl. ............................. 47/34 A; 47/34 D
[51] Int. Cl.² .................................. A01G 9/02
[58] Field of Search .................. 47/34, 38, 38.1, 1.2

[56] References Cited
UNITED STATES PATENTS

| | | | |
|---|---|---|---|
| 195,580 | 9/1877 | Crater | 47/34 |
| 296,028 | 4/1884 | Martin | 47/34 |
| 1,869,606 | 8/1932 | Mennell et al. | 47/34 |
| 2,026,679 | 1/1936 | Higgins | 47/34 |
| 2,834,153 | 5/1958 | Fearn | 47/34 |

FOREIGN PATENTS OR APPLICATIONS

| | | |
|---|---|---|
| 6192/06 | 6/1906 | Australia |
| 8,597 | 1902 | United Kingdom |

*Primary Examiner*—Robert E. Bagwill
*Attorney, Agent, or Firm*—Young & Thompson

[57] ABSTRACT

The invention relates to a device within a container intended to receive earth and plants, which is constituted by a hollow body opened at each end, one of these ends comprising fixing means for the device onto the bottom of the container. In service position the hollow body surrounds the opening of the bottom of the container. The other end of the hollow body, distant from the bottom of the container, is provided with at least one opening.

2 Claims, 4 Drawing Figures

DEVICE FOR THE RETENTION OF WATER IN FLOWER CONTAINERS

The present invention has for its object the provision of a retaining device for the water in flower containers.

Flower containers available on the market are ceramic and have a slightly conical shape.

They comprise at their bottom a hole intended for the evacuation of water.

As a matter of fact a completely tight container which retains thus too much water is a cause of the rotting of the plants.

On the other hand a container having a hole enables the water to be completely and rapidly evacuated. This water crosses the earth-layer without giving sufficient time for the roots to be fed.

Therefore these containers are generally placed in flower tubs or on dishes in which the water is recuperated. The plants live then on water from this supply.

In this case, the water evaporates and the plant soon lacks moisture.

The present invention tends to remedy to these drawbacks by the fact that the flower container comprises a retention device for the water, characterized by the fact that this device is constituted by a hollow body open at each end, one of these ends comprising fastening means for the device onto the bottom of the container, and by the fact that in service position, this hollow body surrounds the bottom opening of the container, and by the fact that the other end of the hollow body, distant from the bottom of the container, is provided with at least one opening.

The attached drawing shows schematically and by way of example three embodiments of the device according to the invention.

Figure 1:
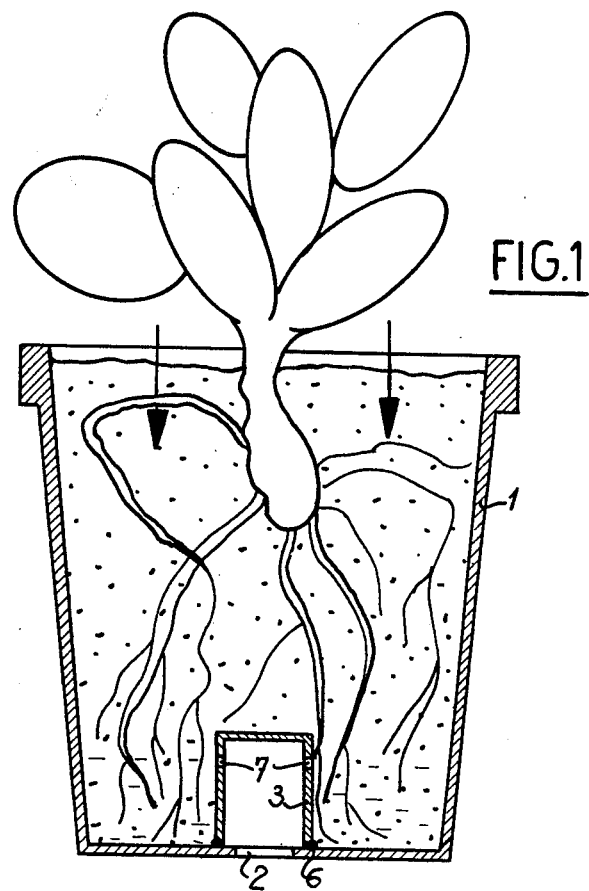
FIG. 1 shows in cross section a first embodiment of a flower container in which a device is glued.
Figure 2:
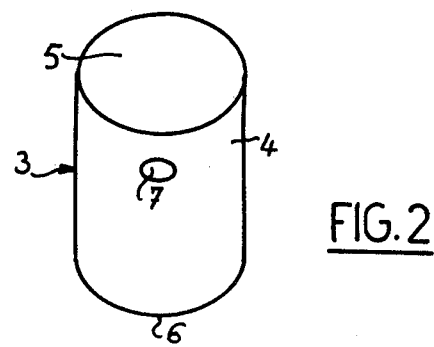
FIG. 2 is a perspective view of the first embodiment of the device.

The flower-container 1 comprises a hole 2 for the evacuation of water. Over this hole 2 the water retention device 3 is located (FIG. 1). The retention device 3 is a cylinder 4 closed at its end 5. It comprises an adhesive portion 6 permitting one to fasten it on the container. It may also be glued on it. This device 3 comprises further two holes 7 drilled in its upper part. These holes are alined on the same horizontal axis. In service position the cylinder is glued onto the bottom of the container in such a way that it covers the hole 2 of this container.

Figure 3:
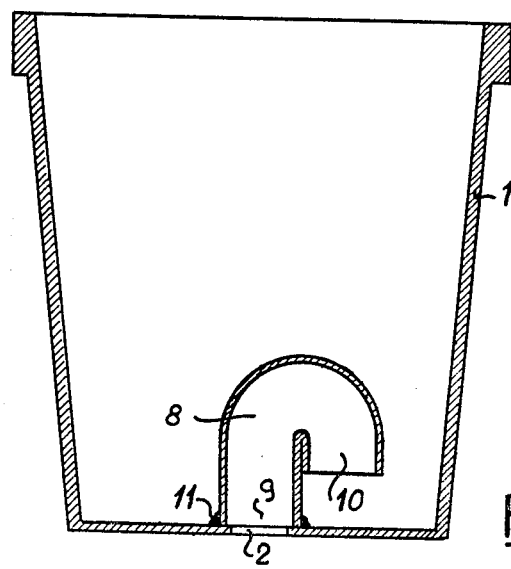
FIG. 3 is a cross sectioned view of a flower-container in which a device is glued according to the second embodiment.

In the second embodiment (FIG. 3) the retention device 8 is a bent cylinder. The two ends 9 and 10 of this cylinder are open. On the side of the end 9 the device comprises an adhesive portion 11 permitting one to fasten it onto the bottom of the container 1 in order to cover the hole 2 of this container.

Figure 4:
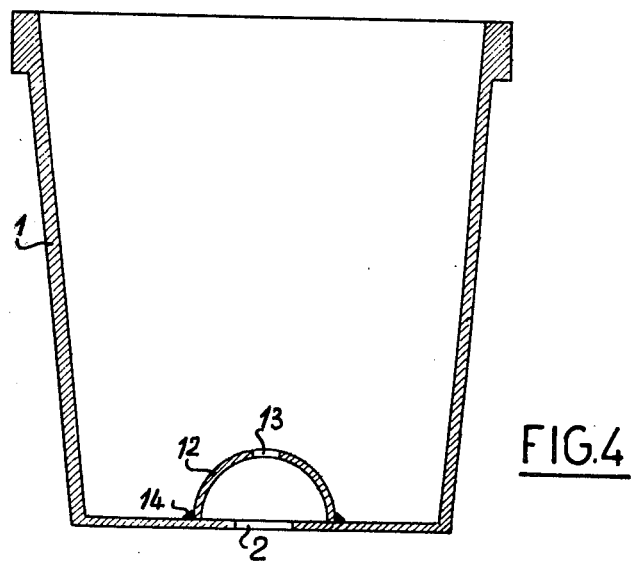
FIG. 4 is a cross-sectioned view of a flower container in which is glued a device acording to the third embodiment.

In the third embodiment (FIG. 4) the retention device 12 is formed by half a hollow sphere comprising a hole 13. This half sphere comprises at its base an adhesive portion 14 to fasten it onto the bottom of the container 1, in order to cover the hole 2 of this container. These three retention devices may be made out of plastic material or of the same material as the container.

When the plant is watered, the water crosses the earth layer and collects in a layer in the bottom of the container, around the device. If the quantity of water poured in is great, the level of the water-layer rises to the point where it reaches the level of the two holes or of the apperture of the bent device or that of the summit of the half sphere, according to the case. The surplus of water may thus be evacuated, only a well defined quantity of water will remain in the container constituting the supply the plant will need according its requirements, and without having its roots completely submerged.

This method hinders also the evaporation phenomena as well as the putrefying phenomena.

This device may also be used for urns, glasses, tanks and so on and may be realized in metal, plastic material, ceramic and so on.

In a variant the devise could be made integral with the flower container.

I claim:

1. In combination with a container for receiving earth and plants, a water-retention device comprising a hollow cylindrical body having opposite ends and a continuous side wall, one said end surrounding an opening in the bottom of the container in watertight sealed relationship with the marginal edges of said opening, the other end being closed, and having at least one opening through said side wall of said hollow body adjacent said closed end and substantially closer to said other end than to said one end, said device being imperforate between said at least one opening and the bottom of the container whereby water can be stored in the container up to the level of said at least one opening.

2. Structure as claimed in claim 1, and adhesive at the lower end of the device to secure the device to the bottom of the container.

* * * * *